(12) United States Patent
Hilton

(10) Patent No.: US 7,706,916 B2
(45) Date of Patent: Apr. 27, 2010

(54) THREE-DIMENSIONAL FORCE AND TORQUE CONVERTER WITH TETRAHEDRAL ARRAY

(75) Inventor: John Allen Hilton, North Turramurra (AU)

(73) Assignee: Spatial Freedom Holdings Pty Ltd. (AU)

( * ) Notice: Subject to any disclaimer, the term of this patent is extended or adjusted under 35 U.S.C. 154(b) by 1145 days.

(21) Appl. No.: 10/532,516

(22) PCT Filed: Oct. 28, 2003

(86) PCT No.: PCT/AU03/01420

§ 371 (c)(1), (2), (4) Date: Apr. 25, 2005

(87) PCT Pub. No.: WO2004/037497

PCT Pub. Date: May 6, 2004

(65) Prior Publication Data

US 2006/0050051 A1 Mar. 9, 2006

(30) Foreign Application Priority Data

Oct. 28, 2002 (AU) .............................. 2002952290

(51) Int. Cl.
*G06F 19/00* (2006.01)
*G06F 3/033* (2006.01)
*G09G 5/00* (2006.01)
*G09G 5/08* (2006.01)

(52) U.S. Cl. ...................... 700/245; 345/156; 345/161; 345/166

(58) Field of Classification Search ..................... 73/581
See application file for complete search history.

(56) References Cited

U.S. PATENT DOCUMENTS

| 3,490,059 | A | * | 1/1970 | Paulsen et al. | .......... | 73/862.043 |
| 4,589,810 | A | | 5/1986 | Heindl et al. | ................... | 414/5 |
| 4,613,752 | A | * | 9/1986 | Davis | ..................... | 250/227.19 |
| 4,811,608 | A | | 3/1989 | Hilton | .................. | 73/862.043 |
| 4,885,490 | A | * | 12/1989 | Takahara et al. | ........... | 310/90.5 |
| 5,113,714 | A | * | 5/1992 | Eklund et al. | .......... | 74/471 XY |

(Continued)

FOREIGN PATENT DOCUMENTS

EP 0244497 11/1987

(Continued)

OTHER PUBLICATIONS

International Search Report for PCT/AUO3/01420 dated Dec. 15, 2003.

*Primary Examiner*—Cuong H Nguyen
*Assistant Examiner*—Sze-Hon Kong
(74) *Attorney, Agent, or Firm*—Ostrolenk Faber LLP

(57) ABSTRACT

A three-dimensional force and torque converter unit for measuring an external force or torque applied to the unit and converting it into a signal, whereby the signal may be used to control a system or device incorporating the converter unit. The converter unit includes a controller formed with four spaced apart arms having six or more degrees of constraint. A force or torque may be applied to the tip portions of each of the arms via a gripping means. Sensors are used to measure the deflection of the arms under an applied loading or torque and an output signal is generated.

13 Claims, 6 Drawing Sheets

U.S. PATENT DOCUMENTS

| | | | | |
|---|---|---|---|---|
| 5,222,400 A | * | 6/1993 | Hilton | 73/862.043 |
| 5,401,128 A | * | 3/1995 | Lindem et al. | 409/132 |
| 5,452,615 A | * | 9/1995 | Hilton | 73/862.043 |
| 5,589,828 A | * | 12/1996 | Armstrong | 341/20 |
| 5,706,027 A | | 1/1998 | Hilton et al. | 345/156 |
| 5,798,748 A | | 8/1998 | Hilton et al. | 345/156 |
| 5,854,622 A | * | 12/1998 | Brannon | 345/161 |
| 6,059,703 A | * | 5/2000 | Heisel et al. | 483/31 |

FOREIGN PATENT DOCUMENTS

JP    2003-075278    3/2003

* cited by examiner

THREE-DIMENSIONAL FORCE AND TORQUE CONVERTER WITH TETRAHEDRAL ARRAY

CROSS REFERENCE TO RELATED APPLICATION

The present application is a 35 U.S.C. §371 national phase conversion of PCT/AU2003/001420 filed 28 Oct. 2003, which claims priority to Australian Application No. 2002952290 filed on 28 Oct. 2002.

The PCT International Application was published in the English language.

FIELD OF THE INVENTION

The present invention relates to control devices and more particularly is concerned with such devices which respond to input forces or torques in three dimensions and permit a control signal to be derived for controlling a machine such as a computer controlled system or the like. However, devices embodying the invention may be applied to other uses.

BACKGROUND OF THE INVENTION

The present inventor is also an inventor of inventions in this field relating to three dimensional force and torque sensing devices which are the subject of U.S. Pat. Nos. 4,811,608; 5,222,400; 5,706,027 and 5,798,748.

A further prior published proposal in the field is U.S. Pat. No. 4,589,810 Heindl et al.

In recognising this other prior published material, the inventor does not admit that any of these other proposals are necessarily known to persons working in the field or of that of common general knowledge in any particular country.

The inventors prior U.S. Pat. No. 4,811,608 discloses a six arm device where the arms are orthogonally arranged and responses in the arms to force or torque with respect to any axis in three dimensions are monitored using sensors.

The inventor has now appreciated that new and useful alternatives to his own prior art and other prior art items disclosed above would be highly advantageous and the present invention is concerned with such alternatives.

SUMMARY OF THE INVENTION

In summary the invention may be described as a controller having four and only four arms extending from a body portion which is adapted to support the device, the arms being spaced from one another in three dimensions and the device having six or more degrees of constraint, tip portions of each of the arms engaging in connection means providing restricted relative motion, the connection means being attached to a gripping means which can apply force and/or torque in a three dimensional sense, the device including response detection means for monitoring responses in at least three of the four arms to provide an output signal representative of force and/or torque applied through the gripping means.

In some embodiments the device is arranged to control a system with the signal.

The arms may be arranged in a tetrahedron shaped envelope and optionally are almost equally spaced from one another in a symmetrical sense with included angles of approximately 109°. However a small degree of non-symmetry is advantageous to ensure there is some preloading mechanically which addresses friction issues yet provides a device in which the computer based system can rapidly perform the relevant calculations that derive an accurate output signal.

Most usefully the arms are constrained such that the device has eight degrees of constraint.

This may be achieved by the tip of each arm having a ball element which is slidable along a cylindrical bore associated with the connection means and rotatable within reasonable limits inside the bore. Thus each such connection has freedom to engage in translational movement along the axis of the bore and limited freedom to rotate. The ball joint is thus constrained in two directions defining a plane at right angles to the axis of the bore and there are four dimensions of freedom in total and two constraints at each joint.

Optionally, the sensors for monitoring response in the arms are disposed around a circular path in a plane. The sensors may advantageously be an optically based system.

The optical system can detect very accurately extremely small deflections in the arms responsive to the applied force or torque.

Another embodiment is one in which six sensors are provided in an array so that displacements in an X-Y set of directions for each of the four arms is achieved giving eight readings which can be resolved to give the required output signal.

Another advantageous embodiment of the present invention includes a plurality of optical sensors as component parts of the response detection means. These optical sensors are concentric and disposed on the same plane.

The six sensors may optionally be configured in pairs around three of the four arms.

The present invention, embodiments of which have been described above, may be usefully arranged as a component of a computer system whether incorporated as an external facility or as an integral sub-system.

By way of technical background, an explanation of principles which may further explain the invention or some of its embodiments will be given, but the applicant is not to be bound by the completeness or correctness of this explanation. Further features of a preferred embodiments will also be explained.

The constraint relationship between two bodies can be determined by summing the constraints of the joint or joints between the two bodies excluding mechanisms which have special geometric alignments. A perfectly constrained device would have exactly six degrees of constraint. Perfectly constrained designs require high joint tolerances to avoid a rattling due to the joint clearances or to avoid excessive friction of the joints due to interference. In practice a slight interference renders the product unusable so perfectly constrained designs tend to exhibit a small amount of rattle due to the clearances in the joints. It is also desirable to provide a small amount of damping through some friction of the joints.

When a control device having a displaceable grip is designed, it is useful to recognise that when the grip is released damping avoids vibration issues and avoids the requirements of a very lightweight grip, as is the case with purely spring-based designs. The friction of a perfectly constrained design, when the grip is released, is only dependent upon the weight of the grip and the frictional properties of the materials and hence is not adjustable in a typical design.

Overconstrained designs can be easily preloaded by slightly offsetting either side of a joint. Optionally only a small overconstraint is used to avoid tolerancing issues. A preferred embodiment of the present invention is slightly overconstrained with eight degrees of constraint. This allows the arms of the tube protrusions to be offset slightly relative to the connection means such as the cylindrical bores to introduce a slight preload when the device is at rest.

Durability of a design is impacted heavily by the wear characteristics of a joint. In perfectly constrained designs with point contact a small amount of wear increases the slop of the joint resulting in increased rattle of the device. The present preferred embodiments have line contact joints that wear much more slowly than point contact. In conjunction with a small preload the device does not exhibit slop.

The preferred embodiment has a central body and arms moulded as a single unit to form a four-armed, generally star-shaped body which for convenience in this specification will be known as a "tetra-star" to provide rigid mounting of the arms of the body and to reduce cost. A complex tool is required to mould the central star part and each arm is formed by three sections of the tool. The preferred embodiment has spherical tips that engage with bores in an outer ball or shell which forms the grip. The mould has three parting lines. To avoid any flash from affecting the operation of the ball-in-hole joints, the ideal spherical surface is optionally cut back along the parting lines with a cylindrical surface so the flash will not touch the surface of the cylindrical bore associated with the outer ball.

In the preferred embodiment, there is an inner ball structure for mounting the tetra-star and comprising a lower and an upper section. Four holes in the inner ball are provided for the cylindrically bored extensions from the outer ball to pass through and engage the tetra-star's arms. These holes also limit the range of motion of the extensions and prevent the arms from being overstressed. Impact loads are passed directly from the extensions to the inner ball structure thereby avoiding damage of the tetra-star's arms so that a robust design is achieved.

Preferred embodiments use infrared LEDs and photodiodes to detect the tetra-star's arm displacements. Only six sets of sensors are required for the full 3D force and 3D torque computation. These are optionally arranged as three pairs with one arm having no sensors. Two pairs on two arms and the other two arms with a single sensor is also possible but less desirable. Similarly eight sets of sensors could be used with a pair for each arm. Each arm would optionally have the optical axes perpendicular to each other.

In the preferred embodiment a shadow mask technology is used for sensing the displacement using an infrared LED and an infrared photodiode. The use of infrared provides greater immunity from ambient light affecting the measurement. Light falling on the photodiode from the LED generates a small current. As the arm deflects, the amount of light varies and in turn the amount of current varies. Greater linearity is achieved by keeping the voltage across the photodiode constant using an appropriate circuit. Each LED/photodiode pair has a characteristic loss factor measured as the ratio of the LED drive current vs. the photodiode output current with no shadow. This is typically around 200:1. For good accuracy the drive circuitry and/or computation needs to compensate for the variation in loss factor.

The preferred embodiment has ball-in-hole joints being 2 degree-of-constraint joints. These have line contact between the spherical ball-tip surface and the whole surface.

DESCRIPTION OF THE FIGURES

For exemplification only the invention will be described with reference to the following illustrative drawings.

DETAILED DESCRIPTION OF THE PREFERRED EMBODIMENTS

Figure 4:
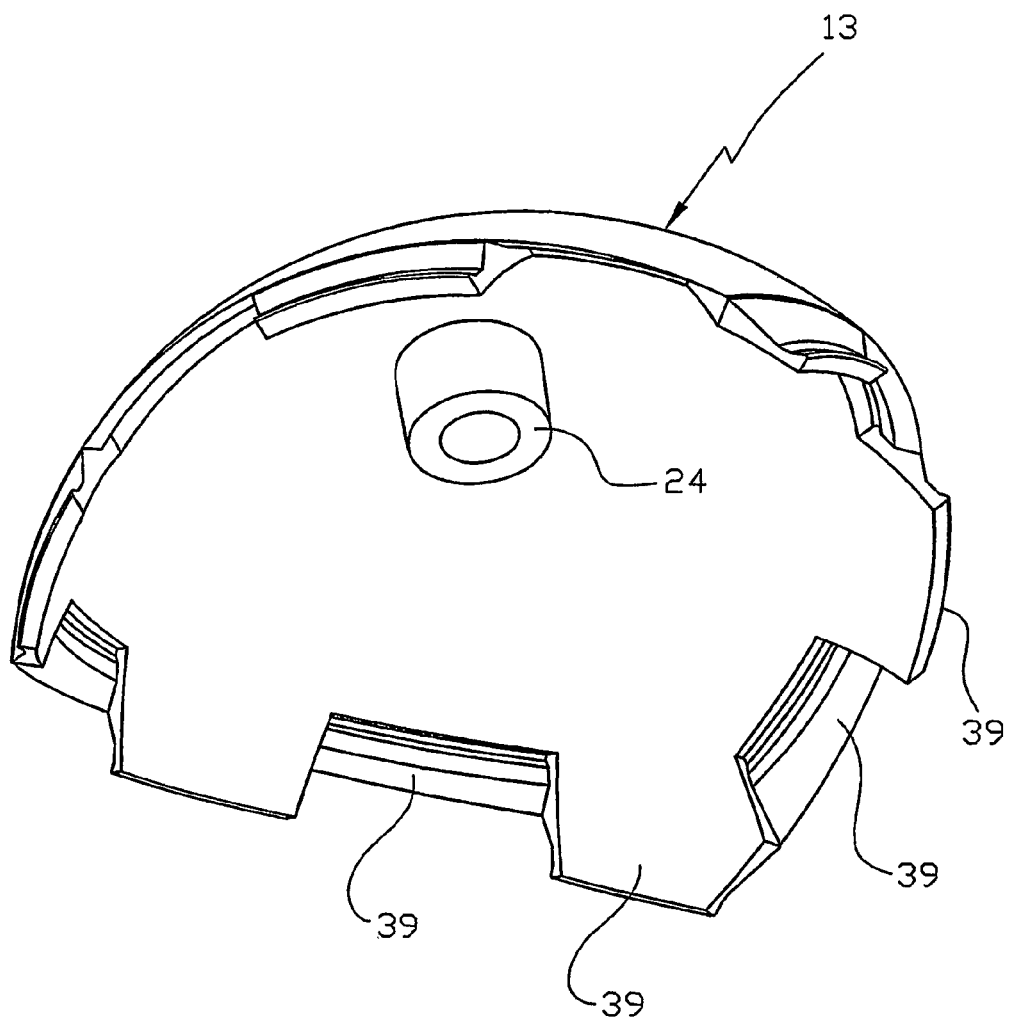
FIG. 4 is a schematic three dimensional representation from the interior of one of the segments of the cap of the device and used for gripping purposes.

The principal components of the device comprise a tetra-star body 10 base, an inner bowl shaped cap 12 and an outer cap 13 formed from segments, one of which is shown in FIG. 4.

The tetra-star 10 has four arms 14 extending along respective axes from central body 15, the axes, being substantially uniformly geometrically disposed relative to one another. Each arm 14 has an elongated reduced cross-section cylindrical portion 14A extending from a tapered base 16 and leading to a tip 17 having an enlarged head with, the surface profile including substantially a spherical portion 18 with a flattened end face 19. A series of structural webs 20 are individually formed on the tetra-star body.

The inner cap 12 has apertures 30 for accommodating tubular retainers 24 associated with the outer cap 13 and thereby limited displacement of the cap 13 (which acts as a grip).

Figure 1:
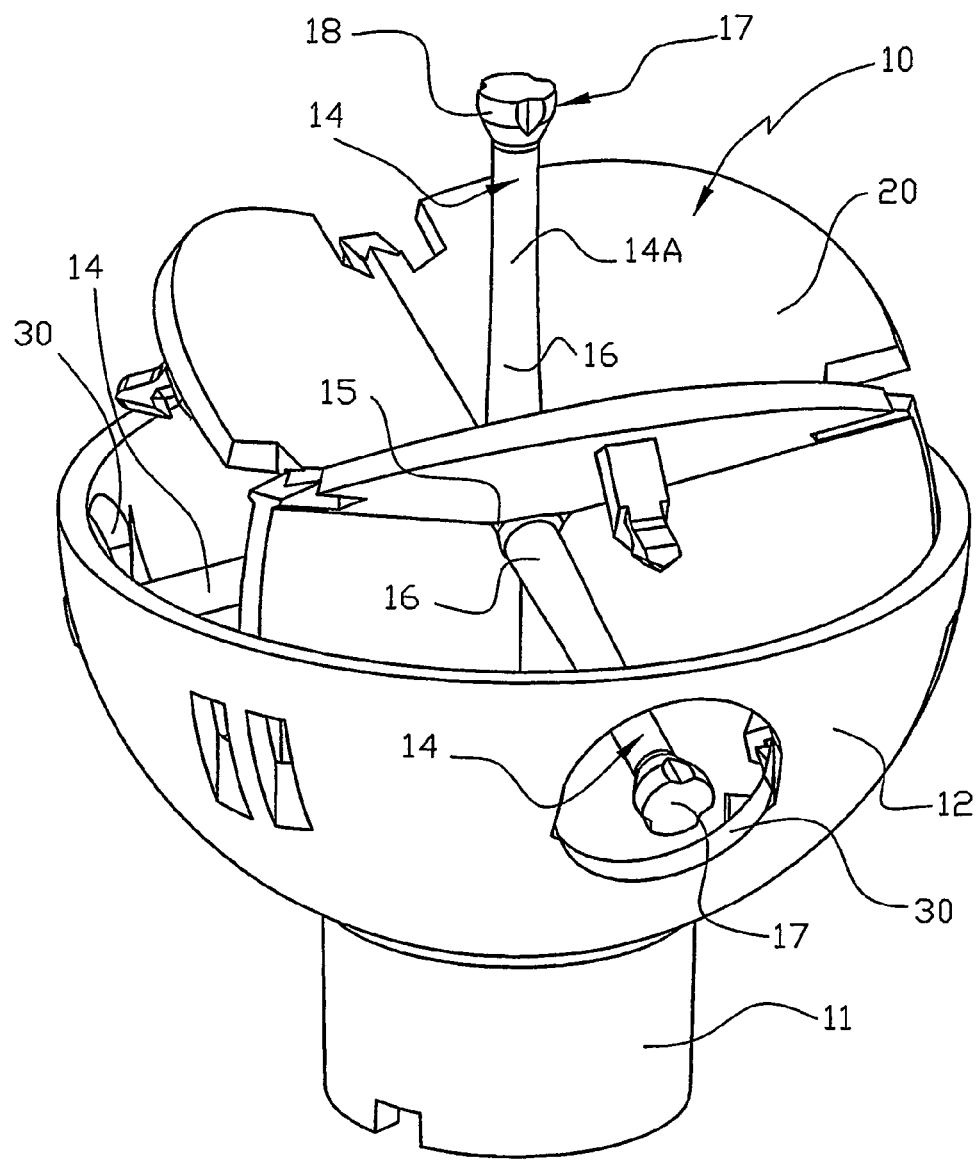
FIG. 1 is a schematic three dimensional representation of a base unit of a three dimensional control device, eg: for controlling computers.
Figure 2:
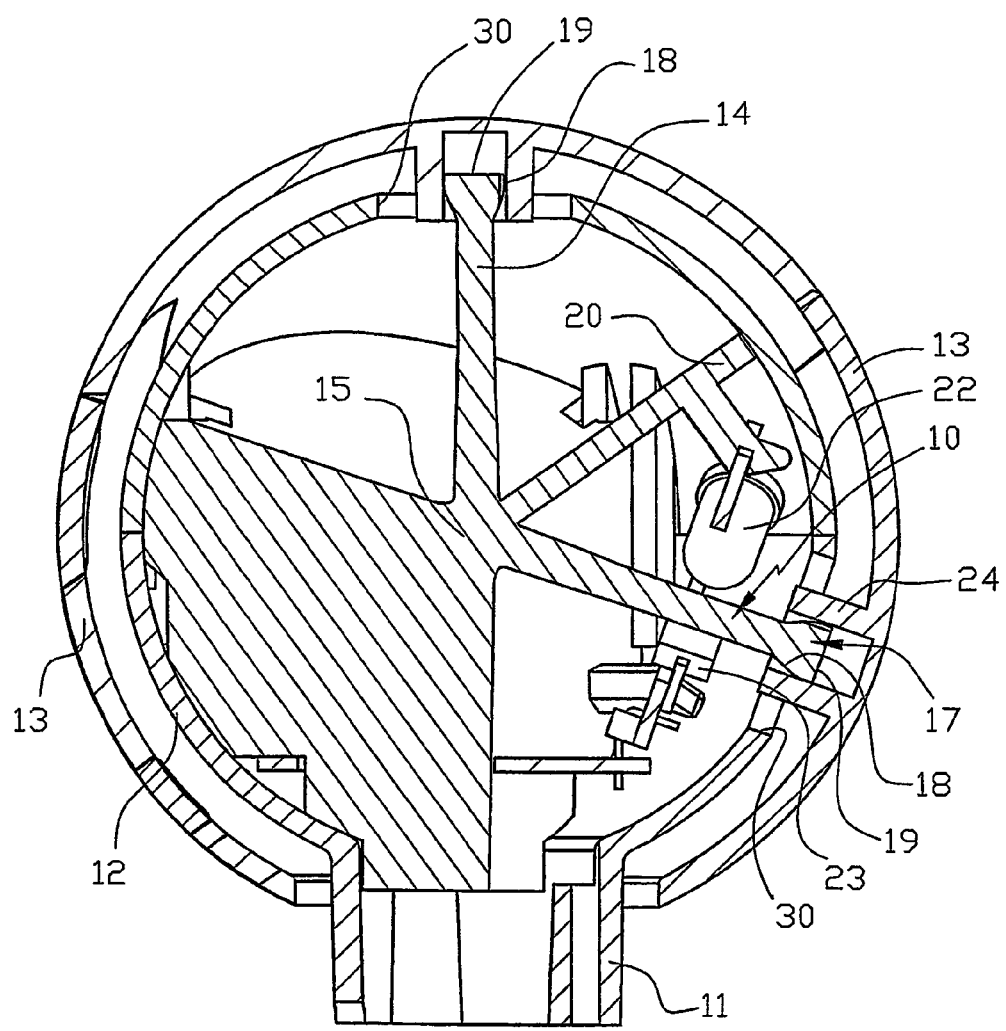
FIG. 2 is a schematic vertical cross section through the device and having a generally spherical gripping cap for manual manipulation to operate the device.
Figure 3:
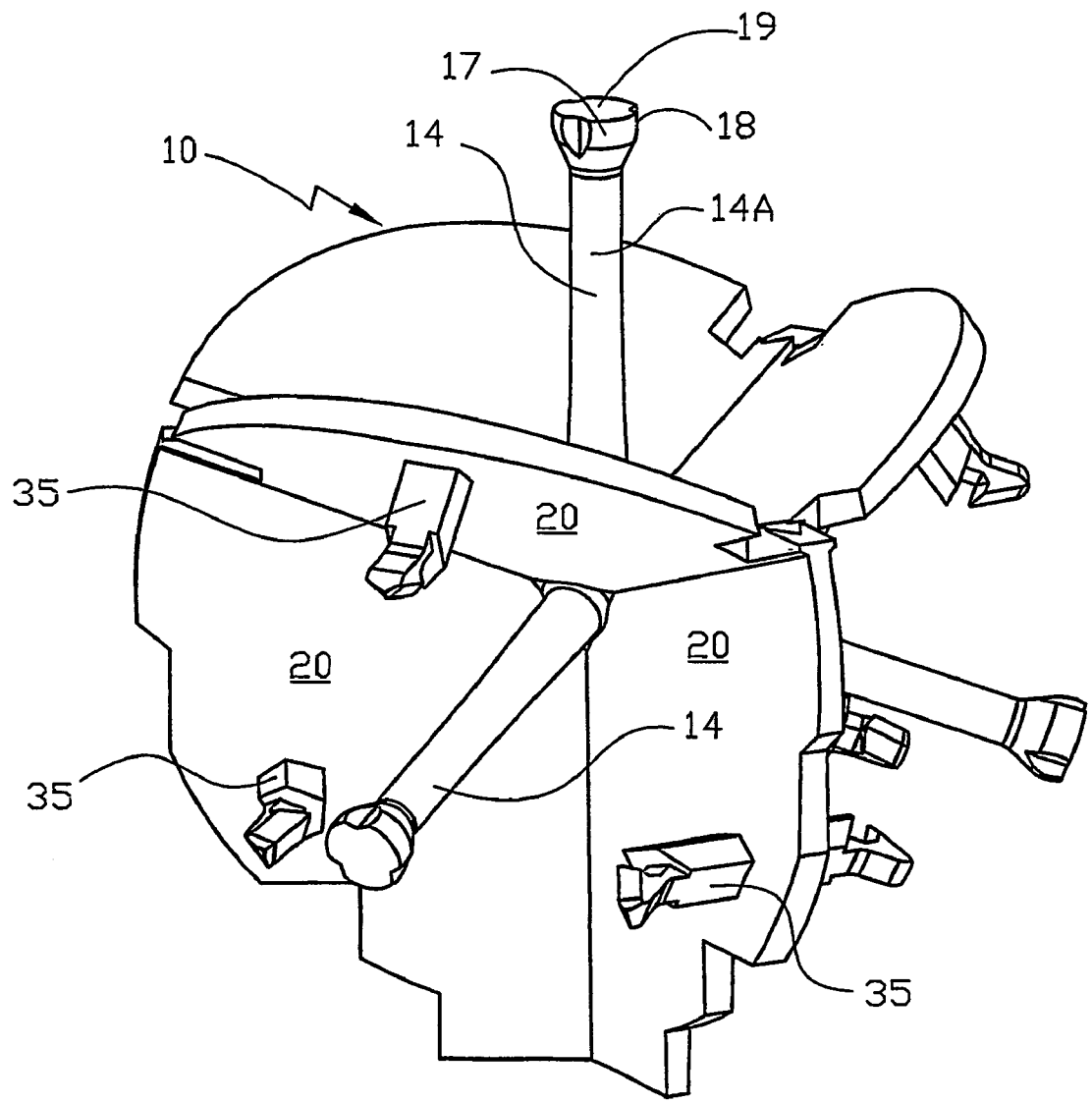
FIG. 3 is a schematic three dimensional view of a tetra-star component used in the device.

As most clearly seen in FIG. 2 one of the arms extends substantially vertically upwards and, as described above, a preferred embodiment has optical sensing for detecting flexing in the arms. FIG. 2 shows schematically a photo detector unit 21 having a light omitting diode (LED) 22 and photo detector 23. Each of the arms 14 is constrained with line contact in a respective tubular retainer 24 which is integrally formed with and projects inwardly from the respective cap segments of 13 to engage the tips 17.

Figure 5:
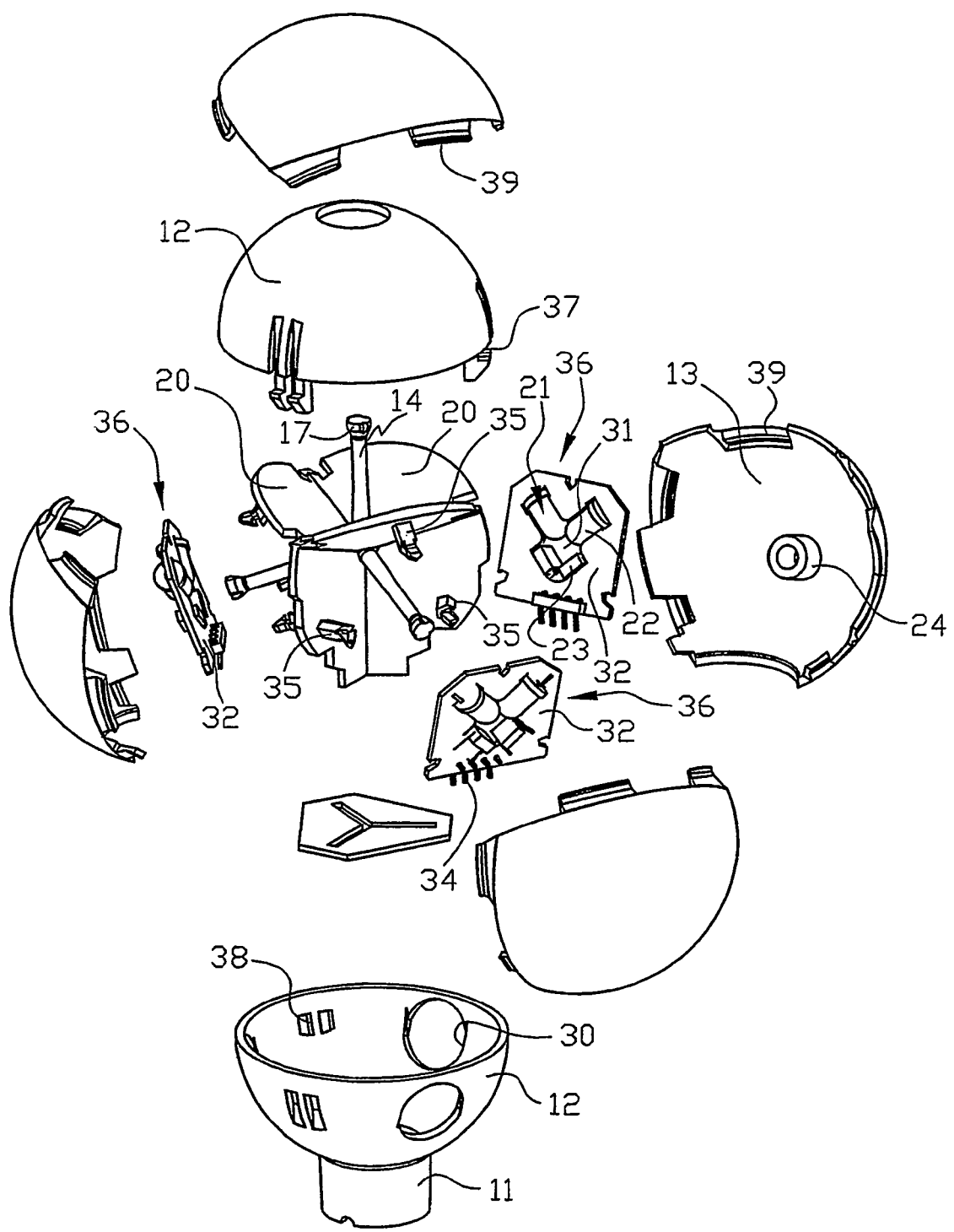
FIG. 5 is a three dimensional exploded view of the device of FIGS. 1-4 in the form of a practical embodiment.
Figure 6:
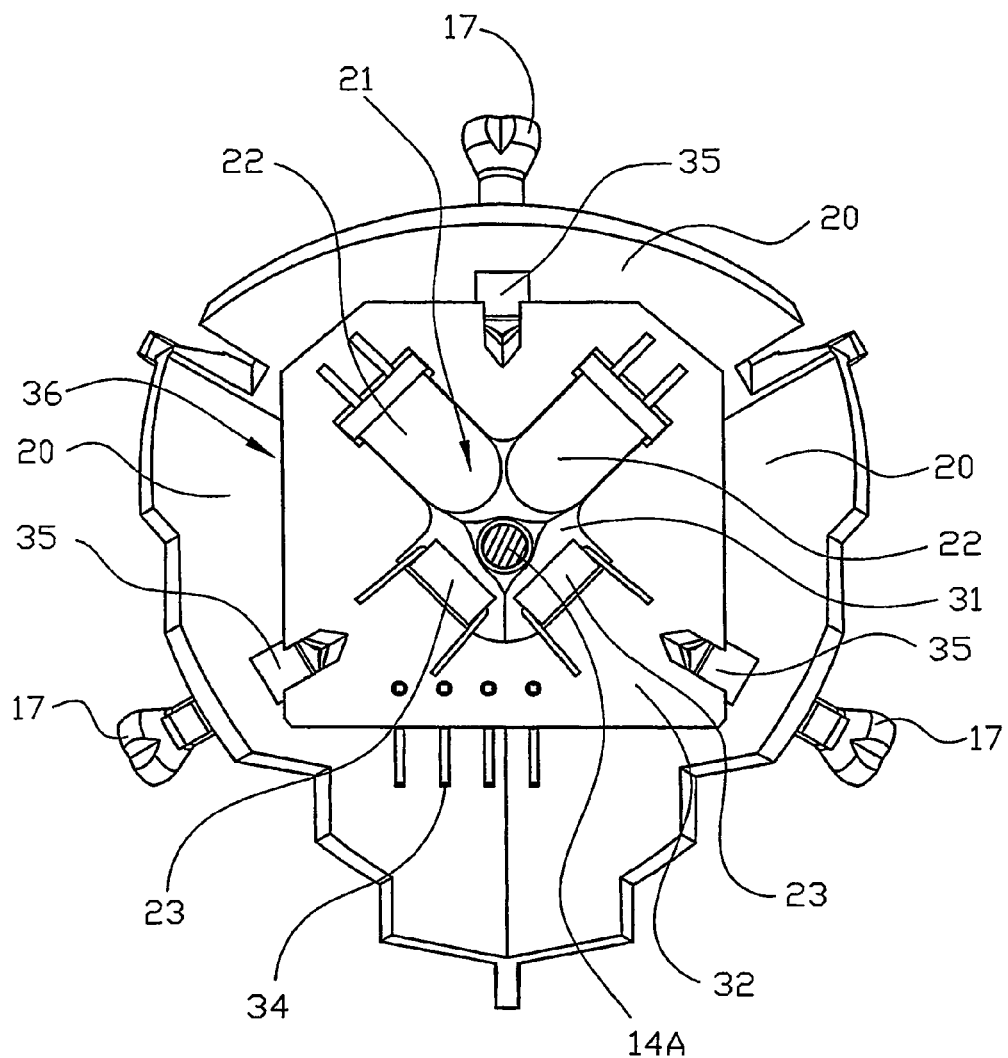
FIG. 6 is a schematic view similar to the view of FIG. 3, however the tetra-star component is viewed along the axis of one of the arms. This view also shows one of the optics sub-assemblies. The tip of the arm has been excluded to provide a better view of the optics sub-assemblies.

Referring now to FIGS. 5 and 6 small cut-outs 31 in each of the three lower printed circuit boards (PCB) 32 provides clearance for the assembly of the photo detector unit 21 into the inner cap 12. Each of the three lower PCBs 32 mounts a printed circuit board interface 34. There are three triplets of optics subassembly supports 35 protruding from the structural webs 20 to easily and accurately mount respective optics subassemblies 36 which include the PCB 32 and two photo detector units 21.

The PCB interface 34 provides interconnections for the optics subassemblies 36 and mounts interface electronics (not shown). A ribbon cable (not shown) is soldered to the PCB interface 34 and runs inside a stem 11 for connection to external electronics (not shown).

The top and bottom sections of the inner cap 12 respectively include three pairs of clips 37 and three pairs of clip apertures 38 for inter-engagement. The stem 11 has three screw bosses (not shown) for mounting the device to a base (not shown), a ribbon cable exit slot and a keying slot to ensure the device is mounted correctly. The edges of the segments of the outer cap 13 have interlocking tabs 39 for mutual attachment and assembly. These tabs 39 require all four parts of the outer cap 13 to be assembled at the same time. The interlock design of the tabs 39 require a simple two-part moulding tool for manufacture. Although the segments of the outer cap 13 mechanically engage, the segments are glued for strength.

FIG. 6 clearly shows how the arms 14 are offset from the light omitting diodes 22 and corresponding photos detectors 23 such that the variation in light due to the deflection of the arms 14 can be easily measured.

The tetra-star 10 is designed for plastic injection moulding. Notably, the spherical portion 18 of each arm 14 needs to be accurate and has sections profiled to keep any moulding flash below the spherical portion 18. The type of plastic needs to have a good fatigue life to handle the repetitive bending stresses imposed on the arms 14 and it should have low friction with the outer cap material. Delrin® is a suitable material for the tetra-star 10.

The arrangement is such that the application of force or torque through the outer cap 13 with respect to any axes is detected by a characterising flexing in the arms. This flexing can be detected and computation determines the appropriate signal to be directed to a device such as a computer.

As the outer cap 13 is moved, the four tubular retainers 24 push on the four arms 14 deflecting them so they oppose the displacement of the outer cap 13. Ignoring the very small and hence insignificant frictional components, each arm tip 17 force vector can be considered as a 2D force vector lying in a plane normal to the corresponding axis of the tubular retainer 24. A simplifying assumption is made that each plane remains stationary as the outer cap 13 moves. The very small errors due to this assumption are insignificant. The deflection of each arm tip 17 is proportional and in the same direction as the 2D force vector. Using standard engineering mathematics, each 2D force vector acting through a arm tip 17 can be transformed into a 3D force vector and a 3D torque vector acting through the centre of the device. The 3D force vector and 3D torque vector acting on the outer cap 13 is then calculated by summing the four 3D force vectors and summing the four 3D torque vectors respectively.

The force vector 13 acting on an arm tip 17 is proportional to the deflection measured by the photo detector unit 21 (or sensor 21) located part way down the length of the arm 14. The ratio of the force on the arm tip 17 to the measured deflection is constant and can be measured experimentally or calculated from an arm's spring constant combined with geometric calculations of the shape of a deflected arm 14. Given the constant ratio, the force is easily calculated from the deflection by multiplication.

From engineering theory a minimum of six single value sensors are required to measure a simultaneous 3D force vector and 3D torque vector. Clearly, a device with four pairs of sensors, a pair for each arm, is functional. A device with three pairs of sensors can be used if the fourth 2D force vector can be calculated from the other three. Consider the device of FIG. 5 where the lower three arms 14 have sensors 21 but the top arm 14 does not. Using each of the three measured 2D force vectors the force component tangential to a circle, centred on the centre of the device and passing through the centre of the top arm tip 17, is calculated. These three force vector components are then mathematically rotated so as to act through the centre of the top arm's tip 17. These three force vectors are then summed to calculate the 2D force vector associated with the fourth arm 14.

It is helpful to consider the simple situation where the outer cap 13 is pushed downwards by a force acting through the centre of the device. The top arm 14 does not deflect but the lower three arms 14 deflect downwards sharing the load equally. The required tangential components happen to be the same as their respective 2D force vectors. Rotating these force vectors so that they act through the centre of the top arm 14 results in three equal force vectors acting 120° to each other and therefore adding to zero as expected.

It is also theoretically possible to have a device with two pairs of sensors 21 on two arms 14 and two single sensors 21, appropriately oriented, on the other two arms 14.

In this specification, the word "comprising" and its variations, such as "comprises", has a meaning such that the word does not preclude additional or unrecited elements, substances or method steps, in addition to those specifically recited. Thus, the described apparatus, substance or method may have other elements, substances or steps in various embodiments of the invention. The purpose of the claims is to define the features which make up the invention and not necessarily all features which a working embodiment of the apparatus, substance or method, to which the invention defines, may have. The apparatus, substance or method defined in the claims may therefore include other elements, steps or substances as well as the inventive elements, steps or substances which make up the invention and which are specifically recited in the claims.

The invention claimed is:

1. A controller device comprising:
   a body portion providing a support for the controller device and having a mounting portion;
   four and only four transversely flexible but axially stiff arms extending from the mounting portion of the body portion, the arms being spaced from one another in three dimensions in a substantially tetrahedral array, each arm having an axis and a tip portion;
   a gripping device;
   four connection joints, each connection joint connecting a respective one of the arms to the gripping device, each connecting joint having a cylindrical socket with an axis substantially aligned with the axis of the arm and having a substantially part-spherical engagement element engaged in and relatively slidable along the socket and rotatable in the socket to restrict relative motion of the four arms within the controller device, whereby the gripping device is operable to receive and transmit any applied force and any applied torque in any of the three dimensions, and the interaction between the gripping device, the connection joints and the arms results in any applied force and any applied torque resolving into four opposing forces which lie in faces of the tetrahedral array and are substantially normal to the axes of the four arms, and substantially no axial load is applied to the arms; and
   a response detector operable for monitoring responses to the applied force and applied torque in at least three of the four arms whereby transverse displacement of the arms is monitored, the response detector being further operable to provide an output signal representative of the any force and any torque applied through the gripping device.

2. A controller device as defined in claim 1, wherein the response detector is operable for directly monitoring response in only three of the four arms, and the controller device further comprises a calculator operable for calculating values of a response in the fourth arm from data representing monitored responses in the only three arms.

3. A controller device as defined in claim 1, further comprising a system connected to the response detector to receive the output signal.

4. A controller device as defined in claim 1, wherein the arms are arranged in a tetrahedron shaped envelope and are almost equally mutually spaced in a symmetrical sense with a small degree of non-symmetry to provide pre-loading at the connection joints.

5. A controller device as defined in claim 1, wherein the tip portion of each arm has a portion providing the substantially part-spherical engagement element of each connection joint.

6. A controller device as defined in claim 1, wherein the response detector includes a plurality of optical sensors each of which has an emitter and a detector, the optical sensors being arranged substantially in a same plane and each optical sensor having a respective optical axis transverse to an axis of the associated arm.

7. A controller device as defined in claim 6, further comprising a total of six optical sensors disposed in pairs around three of the four arms.

8. A controller device as defined in claim 1, and including a total of eight sensors provided in an array so that displacements in an X-Y set of responses for each of the four arms results in eight readings constituting the output signal.

9. A computer system comprising:
a controller device including;
a body providing a support for the controller device and having a mounting portion;
four and only four transversely flexible but axially stiff arms extending from the mounting portion of the body portion, the arms being spaced from one another in three dimensions in a substantially tetrahedral array, each arm having an axis and a tip portion;
a gripping device;
four connection joints, each connection joint connecting a respective one of the arms to the gripping device, each connecting joint having a cylindrical socket with an axis substantially aligned with the axis of the arm and having a substantially part-spherical engagement element engaged in and relatively slidable along the socket and rotatable in the socket to restrict relative motion of the four arms within the controller device, whereby the gripping device is operable to receive and transmit any applied force and any applied torque in any of the three dimensions, and the interaction between the gripping device, the connection joints and the arms results in any applied force and any applied torque resolving into four opposing forces which lie in faces of the tetrahedral array and are substantially normal to the axes of the four arms, and substantially no axial load is applied to the arms; and
a response detector operable for monitoring responses to the applied force and applied torque in at least three of the four arms whereby transverse displacement of the arms is monitored, the responses detector being further operable to provide an output signal representative of the any force and any torque applied through the gripping device.

10. A computer system as defined in claim 9, wherein the response detector is operable to directly monitor response in only selected three of the four arms, and the controller device further comprises a calculator operable for calculating values of a response in the fourth arm from data representing the monitored responses in the selected three arms.

11. A computer system as defined in claim 9, wherein the arms are arranged in a tetrahedron shaped envelope and are almost equally mutually symmetrically spaced with a small degree of non-symmetry to provide pre-loading at the connection joints.

12. A computer system as defined in claim 9, wherein each of the response detectors includes a plurality of optical sensors which are concentric and disposed on a same plane.

13. A computer system as defined in claim 12, further comprising a total of six optical sensors disposed in pairs around three of the four arms.

* * * * *